(12) United States Patent
Menzenbach et al.

(10) Patent No.: US 10,619,322 B2
(45) Date of Patent: Apr. 14, 2020

(54) DRY-BULK TANKER, CONVEYING SYSTEM FOR A DRY-BULK TANKER, AS WELL AS WORK TRAIN

(71) Applicant: Wirtgen GmbH, Windhagen (DE)

(72) Inventors: Christoph Menzenbach, Neustadt (DE); Cyrus Barimani, Königswinter (DE); Frederic Hess, Montabaur (DE)

(73) Assignee: Wirtgen GmbH (DE)

( * ) Notice: Subject to any disclaimer, the term of this patent is extended or adjusted under 35 U.S.C. 154(b) by 0 days.

(21) Appl. No.: 16/223,164

(22) Filed: Dec. 18, 2018

(65) Prior Publication Data

US 2019/0194896 A1 Jun. 27, 2019

(30) Foreign Application Priority Data

Dec. 22, 2017 (DE) .................... 10 2017 223 698

(51) Int. Cl.
| | |
|---|---|
| *E02D 3/12* | (2006.01) |
| *E01C 19/20* | (2006.01) |
| *B60P 3/22* | (2006.01) |
| *B65G 53/50* | (2006.01) |

(Continued)

(52) U.S. Cl.
CPC .............. *E02D 3/12* (2013.01); *B60P 3/2245* (2013.01); *B65G 53/50* (2013.01); *E01C 19/205* (2013.01); *E01C 19/2025* (2013.01); *E01C 21/00* (2013.01); *E02D 3/126* (2013.01); *B60P 1/56* (2013.01); *E01C 2019/2065* (2013.01)

(58) Field of Classification Search
CPC ...... E01C 21/00; E01C 19/025; E01C 19/201; E01D 3/12; B60P 3/2245; B65G 53/50; E02D 3/126
See application file for complete search history.

(56) References Cited

U.S. PATENT DOCUMENTS 8,511,933 B2   8/2013 Menzenbach et al.
2017/0355534 A1*  12/2017 Hunt ............... B65G 53/16

FOREIGN PATENT DOCUMENTS

| DE | 2939648 A1 | 4/1981 |
|---|---|---|
| DE | 3910617 A1 | 10/1990 |
| DE | 202008012104 U1 | 3/2010 |

(Continued)

OTHER PUBLICATIONS

EPO search report for corresponding application No. 18213633.3, dated Aug. 28, 2019, 3 pages (not prior art).

*Primary Examiner* — Carib A Oquendo
(74) *Attorney, Agent, or Firm* — Lucian Wayne Beavers; Patterson Intellectual Property Law, PC

(57) ABSTRACT

A dry-bulk tanker for the provision of binding agents for soil stabilization for a spreading device comprises a storage container (10) for binding agent. A mechanical conveying device (18) for conveying binding agents from the storage container (10) into an intermediate chamber (20) is connected to the storage container (10). A pneumatic conveying device (36) for conveying the binding agent to the spreading device is connected to the intermediate chamber (20). A pressure relief device (40, 41) is connected to the mechanical conveying device in order to avoid the entry of compressed air into the storage container (10). The invention furthermore relates to a conveying system for a dry-bulk tanker and to a work train for working soils with a self-propelled ground working machine and a dry-bulk tanker.

16 Claims, 3 Drawing Sheets

(51) Int. Cl.
*E01C 21/00* (2006.01)
*B60P 1/56* (2006.01)

(56) References Cited

FOREIGN PATENT DOCUMENTS

| | | |
|---|---|---|
| DE | 102009008884 A1 | 8/2010 |
| DE | 102012021421 A1 | 4/2014 |
| EP | 2388217 A1 | 11/2011 |

\* cited by examiner

DRY-BULK TANKER, CONVEYING SYSTEM FOR A DRY-BULK TANKER, AS WELL AS WORK TRAIN

BACKGROUND OF THE INVENTION

1. Field of the Invention

The invention relates to a dry-bulk tanker for the provision of binding agents for soil stabilization for a spreading device, as well as to a conveying system for a dry-bulk tanker. Furthermore, the invention relates to a work train for working soils with a self-propelled ground working machine and a dry-bulk tanker.

2. Description of the Prior Art

An improvement or stabilization of soils can be effected in particular by means of dry binding agent such as, for example, lime or cement. To this end, the binding agent is introduced into the soil in order to, in particular, increase the load-bearing capacity of the same. Soil stabilization is performed in particular in the construction of roads or railway lines, as well as in the construction of industrial sites.

Binding agent spreaders are known for the purpose of spreading binding agent. Such vehicles comprise a large container for the reception of binding agent. The spreading of binding agent is effected in such a fashion that the spreading vehicle drives ahead of the stabilizer or recycler. An upper layer of a surface to be stabilized is milled off by the stabilizer or recycler by means of, for example, a milling/mixing drum, the milled-off material is optionally mixed with further material, and spread again. The binding agent spread by the binding agent spreader ahead of the stabilizer or recycler is also picked up as part of this process. It is of disadvantage with such binding agent spreaders driving ahead that the binding agent may drift. This increases the costs as a result of the increased material requirement and leads to dust exposure for the workers and residents.

Moreover, stabilizers and recyclers are known which comprise a binding agent spreader. Such stabilizer or recycler with integrated binding agent spreader is known, for example, from DE 10 2009 008 884 (U.S. Pat. No. 8,511,933). It is hereby possible for the binding agent to be spread, for example, directly ahead of the milling/mixing rotor so that the binding agent is picked up immediately by the milling/mixing rotor. In this process, there is no hazard of drifting. On the other hand, such stabilizers or recyclers with integrated binding agent container have the disadvantage that such binding agent container has a small filling volume and must therefore be filled regu-larly. The filling of such binding agent container is effected by means of a dry-bulk tanker. Binding agent is fed from the dry-bulk tanker to the binding agent container of the stabilizer or recycler at regular intervals. Feeding is effected, for example, pneumatically. To this end, the binding agent container of the dry-bulk tanker is pressurized for the filling process. Filling the container of the stabilizer or recycler while driving is possible to a limited extent only.

A work train comprising a dry-bulk tanker and a milling vehicle is known from DE 20 2008 012 104. The milling vehicle comprises a storage container for dry bulk material such as a binding agent. Said container features a small volume and is, insofar, filled permanently by the dry-bulk tanker. In this arrangement, the dry-bulk tanker is designed in such a fashion that it is not necessary to pressurize the entire binding agent container of the dry-bulk tanker. Rather, a mechanical transport device is arranged inside the binding agent container of the dry-bulk tanker which conveys the dry bulk material into a chamber by means of, for example, a conveying screw. From the chamber, the dry bulk material is thereupon conveyed to the storage container of the milling vehicle pneumatically via a transport line. However, it is of disadvantage in this design that, due to the pneumatic conveying process, a swirling of the binding agent takes place also inside the binding agent container of the dry-bulk tanker. This may lead to an inconsistent feed of binding agent to the storage container of the milling vehicle. Furthermore, there is the disadvantage that an increased dust development occurs inside the dry-bulk tanker. This leads to higher loads of the filter systems and may furthermore also give rise to malfunctions of sensors, in particular, of filling level sensors arranged inside the dry-bulk tanker.

SUMMARY OF THE INVENTION

The object of the invention is to create a dry-bulk tanker for the provision of binding agent for soil stabilization for a spreading device with which a reliable feed of binding agent is possible, as well as to create a corresponding work train.

The object according to the present invention is achieved by a dry-bulk tanker, a conveying system for a dry-bulk tanker, and a work train for working soils such as roads, railway lines, industrial sites etc. by means of a ground working machine and a dry-bulk tanker as disclosed herein.

The dry-bulk tanker is used, in particular, to fill a binding agent container of a ground working machine, such as a stabilizer or recycler, as described, for example, in DE 10 2009 008 884 (U.S. Pat. No. 8,511,933). The dry-bulk tanker according to the present invention for the provision of binding agent for soil stabilization for a spreading device comprises a storage container for the binding agent. A mechanical conveying device is connected to the storage container. The binding agent is conveyed from the storage container into an intermediate chamber by means of the conveying device. A pneumatic conveying device is connected to the intermediate chamber. The binding agent is conveyed to the spreading device by means of the pneumatic conveying device, wherein the spreading device comprises, in particular, a storage container or intermediate buffer, respectively. The spreading device is specified, in particular, directly on a ground working machine. According to the present invention, a pressure relief device is connected to the mechanical conveying device. An entry of compressed air into an area of the storage container of the dry-bulk tanker in which a swirling-up of the binding agent in the storage container of the dry-bulk tanker would interfere with a reliable conveying process is essentially avoided by means of the pressure relief device.

The pressure relief device may be a valve connected to the mechanical conveying device. Pressure possibly forming in the mechanical conveying device may be reduced or compressed air discharged, respectively, via the valve. The compressed air in question may be immediately discharged into the environment, wherein it is preferred for a filter device to be specified in order to prevent an escape of binding agent. In particular when specifying a filter device, it is not necessarily required to additionally specify a valve. A corresponding discharge opening in the mechanical conveying device through which the compressed air can escape is sufficient.

The mechanical conveying device is, for example, a gravity conveyor. In this design, conveying of the binding agent may be effected, in particular, based on the own weight, wherein conveying of the binding agent may also be assisted, for example, by a screw conveyor or the like.

In order to prevent a swirling-up of spreading agent as a result of the compressed air entering the storage container of the dry-bulk tanker in an area causing swirl-ups such as, in particular, in the area of the removal of the spreading agent, it is particularly preferred for the mechanical conveying device to comprise a conveying chamber. In this arrangement, a conveying device may be designed, for example, according to an airlock. An opening to the storage container may thus be opened and closed via corresponding slide gates, and a connection between the conveying chamber and the intermediate chamber may be opened and closed via additional slide gates. Analogous to an airlock, the conveying chamber may thus be initially filled with binding agent from the storage container by opening the relevant slide gate, wherein the slide gate is thereupon closed prior to the slide gate closing the opening to the intermediate chamber being opened. As a result of this, nothing but pressure ever enters the conveying chamber from the intermediate chamber. According to the present invention, the conveying chamber is thereupon connected to the pressure relief device so that the pressure in the conveying chamber may be reduced prior to the airlock being connected to the storage container again, for the purpose of filling with binding agent, by operating the relevant slide gate.

In a particularly preferred embodiment, the mechanical conveying device is a rotary feeder. Said rotary feeder comprises, in particular, a plurality of conveying chambers arranged about an axis of rotation. Binding agent enters a conveying chamber open in the direction of the storage container by way of gravity or by means of a further conveying device. The respective conveying chamber is thereupon rotated further by the rotary feeder until the binding agent in the respective chamber con-tinues from the same into the intermediate chamber due to gravity. With the aid of a rotary feeder, it is possible, in particular, to realize a continuous conveying of binding agent from a plurality of conveying chambers arranged about an axis of rotation. Compressed air enters a conveying chamber connected to the intermediate chamber, or the pressure in said conveying chamber increases, respectively. Prior to said conveying chamber being connected to the storage container again, a reduction of pressure in said conveying chamber is achieved by means of the pressure relief device. To this end, the connection of the respective conveying chamber to the intermediate chamber is interrupted during the further rotation of the rotary feeder. The pressure reduction is effected in this position.

Independent of the type of conveying device used, it is therefore particularly preferred for the pressure relief device to be arranged in an area in which a conveying chamber passing through this area is connected neither to the storage container nor to the intermediate chamber.

In a preferred development of the pressure relief device, the same is connected to the storage container by means of a vent line. The pressure relief device may be formed merely by the connection of the mechanical conveying device to the storage container via a vent line. In addition, a valve may be optionally specified in the vent line. The vent line is preferably connected to an area of the storage container in which the introduction of air does either not cause any swirl-ups of binding agent or the same are non-disturbing. The introduction of the compressed air into the storage container is preferably effected in an upper area of the storage container and/or an area of the storage container remote from the mechanical conveying device.

The storage container preferably comprises a positive pressure outlet. Said positive pressure outlet preferably comprises a filter device in order to avoid an escape of binding agent. In a preferred development, the vent line of the pressure relief device is, in particular, directly connected to the positive pressure outlet. An occur-rence of swirl-ups inside the storage container is thereby avoided.

For conveying the binding agent from the intermediate chamber to the spreading device, it is preferred for the pneumatic conveying device to comprise a compressed air source, in particular, a compressor. The compressor is connected to the intermediate chamber either directly or via a pressure line. The use of a compressor as a pneumatic conveying device has the advantage that, on the one hand, faster conveying of the binding agent from the intermediate chamber to the spreading device can be realized as a result, and, on the other hand, such compressor is usually present in dry-bulk tankers in particular for cleaning purposes.

In a further preferred embodiment, the storage container of the dry-bulk tanker is connected to a plurality of mechanical conveying devices. Preferably, a plurality of separate intermediate chambers are optionally specified, wherein each intermediate chamber is optionally connected to a separate mechanical conveying device. In particular, each mechanical conveying device comprises a separate pressure relief device.

When providing a plurality of intermediate chambers, these are preferably arranged in series with respect to the pneumatic conveying process. In a preferred embodiment, the binding agent is thus conveyed, for example, from a first intermediate chamber into a second intermediate chamber in a first step, and thereupon from said second intermediate chamber to the spreading device. Furthermore, it is also possible to arrange a plurality of intermediate chambers parallel to one another.

In a preferred development of the present invention, the dry-bulk tanker furthermore comprises a pneumatic bypass line bypassing the at least one intermediate chamber. Said bypass line branches off, on the one hand, in particular, from the pressure line, that is, the line between the compressed air source and the intermediate chamber, and is, on the other hand, connected to the conveying line, that is, the line that leads from the at least one intermediate chamber to the spreading device. It is thus possible to generate a higher flow of compressed air or higher pressure, respectively, in the conveying line, and consequently ensure safe feeding of a binding agent to the spreading device. When specifying a plurality of intermediate chambers, the bypass line may optionally also bridge a single intermediate chamber only. Furthermore, a plurality of bypass lines is also possible, each of which bridges a single or a plurality of intermediate chambers. Branches are also possible in a bypass line bridging a plurality of intermediate chambers, which is thereupon connected to a line that connects two neighbouring intermediate chambers. The single bypass line or plurality of bypass lines may preferably be partially or wholly discon-nectable or controllable, respectively, so that it is possible to distribute the amount of compressed air that is conducted through the at least one intermediate chamber or through the at least one bypass line, respectively. It is understood that different bypass lines and/or branches of the bypass lines may each be provided with sepa-rately controllable valves.

The invention furthermore relates to a conveying system for a dry-bulk tanker. This is a separate invention which, in a preferred development, is suitable in particular for the dry-bulk tanker described above. The conveying system according to the present invention comprises a mechanical conveying device for conveying binding agent. Furthermore, the conveying system comprises at least one intermediate chamber for the reception of the binding agent conveyed by the conveying device. A pneumatic conveying device is connected to the intermediate chamber in order to convey the binding agent to a spreading device. In this design, the spreading device is not a component part of the conveying system but part of a separate vehicle or a separate device and, in particular, component part of a self-propelled ground working machine. According to the present invention, the conveying system comprises a pressure relief device which is connected to the mechanical conveying device. The pressure relief device according to the present invention features the advantages described above with reference to the dry-bulk tanker, wherein, in particular, an entry of compressed air into an area of a storage container of the dry-bulk tanker is avoided by means of the pressure relief device when the conveying system is connected to a relevant dry-bulk tanker.

The individual constructional elements of the conveying system are advantageously developed as described above with reference to the dry-bulk tanker. In a particularly preferred embodiment, the mechanical conveying device is, in particular, designed as a gravity conveyor. It is furthermore preferred for the mechanical conveying device to comprise conveying chambers and to be preferably designed as a rotary feeder. It is additionally preferred for the pressure relief device to be connected to the mechanical conveying device in an area in which a conveying chamber passing through said area is connected neither to the storage container of the dry-bulk tanker nor to the at least one intermediate chamber.

As likewise described above in a preferred development with reference to the dry-bulk tanker, it is preferred for the pneumatic conveying device to comprise a compressor which is connected to the at least one intermediate chamber, in particular, via a pressure line. This may be a compressor already specified on the dry-bulk tanker. Furthermore, it is likewise preferred for each mechanical conveying device to be connected to a separate intermediate chamber provided that a plurality of conveying devices is specified. When specifying a plurality of intermediate chambers, it is furthermore preferred for the intermediate chambers to be arranged in series with respect to the pneumatic conveying device. Furthermore, it is possible for a pneumatic bypass line bypassing the at least one intermediate chamber to be specified, which is connected to the conveying line for feeding the binding agent to the spreading device.

The invention furthermore relates to a work train for working soils which are, for example, roads, railway lines, industrial sites, or the like. The work train comprises an, in particular, self-propelled ground working machine such as a stabilizer or recycler. The ground working machine comprises a milling/mixing rotor inside a rotor housing. Furthermore, the ground working machine comprises a spreading device for spreading binding agent. The spreading device is connected to the dry-bulk tanker so that binding agent can be fed from the dry-bulk tanker to the spreading device in particular during the operation. In this arrangement, the dry-bulk tanker is designed as described above and preferably advantageously developed. The spreading device preferably comprises a buffer container for binding agent, wherein the buffer container is thereupon connected to the dry-bulk tanker or the at least one intermediate chamber, respectively, via the conveying line. The maximum conveying rate of the binding agent in the conveying line, which is connected to the buffer container of the ground working machine, is preferably no less than 400 kg/min and, in particular, no less than 550 kg/min. The conveying volume is adjustable, in particular, to the re-quirements or consumption, respectively.

Filling of the buffer container is preferably controlled from the ground working machine. This may be effected, for example, by means of appropriate filling level sensors in the buffer container. In this arrangement, filling of the buffer container may be effected continuously or intermittently.

BRIEF DESCRIPTION OF THE DRAWINGS

Based on a preferred embodiment, the invention is hereinafter illustrated in more detail with reference to the enclosed drawings.

The following is shown.

DETAILED DESCRIPTION

Figure 1:
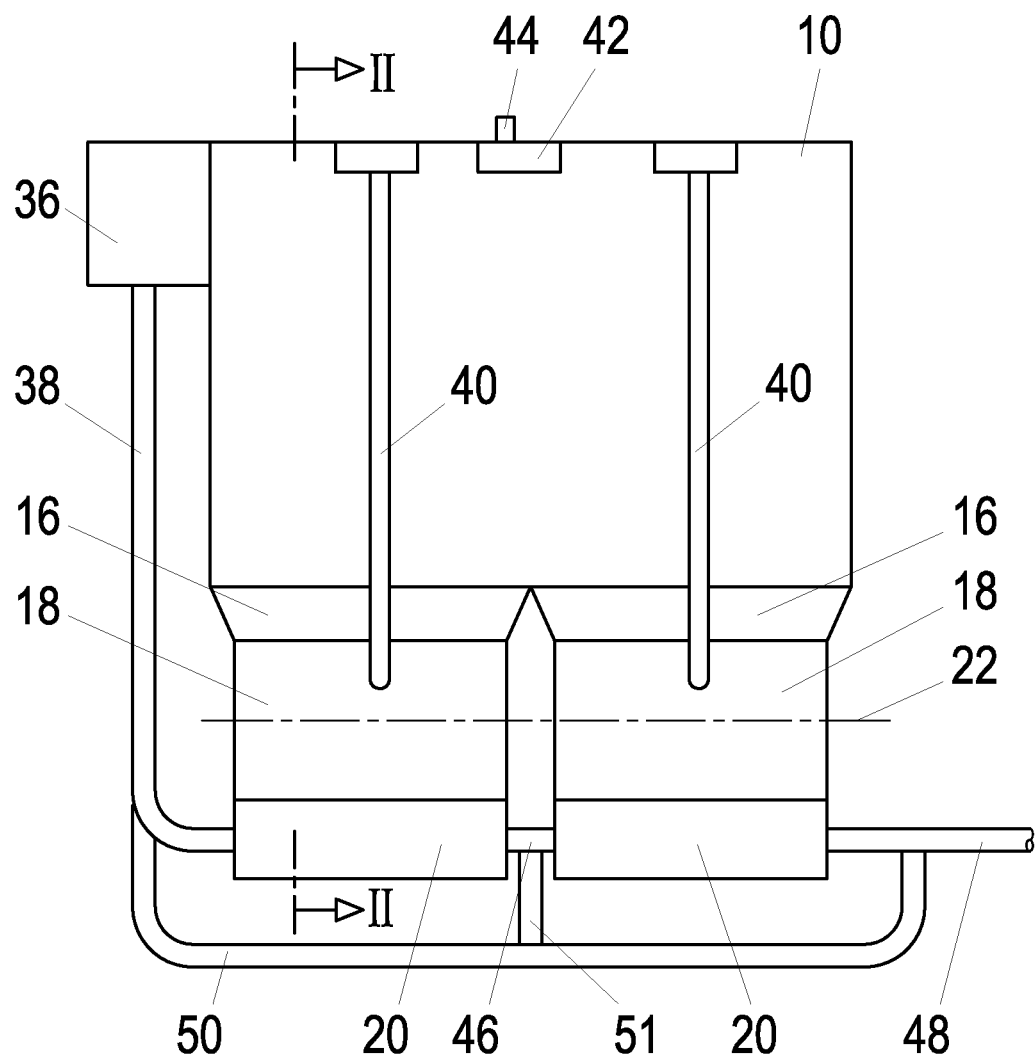
FIG. 1: a schematic rear view of a dry-bulk tanker.

The dry-bulk tanker comprises a storage container 10 for binding agent. The storage container 10 comprises, on an underside 12, two openings 14 which, in the embodiment presented, are connected, via a funnel element 16 each, to a mechanical conveying device 18 each, wherein, in the embodiment presented, the conveying devices 18 are rotary feeders. The rotary feeders 18 are each connected to an intermediate chamber 20. The mechanical conveying devices 18 may also be referred to as mechanical conveyors 18.

From the storage container 10, binding agent enters the funnel elements 16 through the openings 14. This is effected, in particular, by means of gravity, wherein a mechanical conveying device, such as a screw conveyor or the like, may optionally be additionally specified in the storage container, for example, to transport the binding agent to the opening 14 from an end of the storage container 10 remote from the opening 14. The binding agent slides through the funnel devices 16 into an upper conveying chamber which is in position 24 (FIG. 2) of the rotary feeder 18. The rotary feeder 18 rotates about an axis 22 in FIG. 2 in the direction of arrow 25. Thus, after the chamber in position 24 that is currently filled with binding agent, the chambers in positions 34 and 32 will be filled with binding agent. From the conveying chamber in position 30, which is arranged opposite the conveying chamber in position 24, the binding agent enters the intermediate chamber 20 due to gravity. The two conveying chambers in positions 32 and 34, following behind the conveying chamber in position 24 as seen in the direction of rotation 25, are empty. The conveying chambers in positions 26 and 28 have already been filled with binding agent and are emptied into the intermediate chamber 20 successively with the continued rotation of the rotary feeder 18 in the direction of arrow 25.

For pneumatic conveying of the binding agent, compressed air is introduced into the intermediate chamber 20 by means of a conveying device which, in the embodiment presented, is a compressor 36. There is therefore an increased pressure in the intermediate chambers 20 compared to the environment. Compressed air enters the first intermediate chamber 20 as seen in conveying direction via the pressure line 38 connected to the compressor 36. Since the first intermediate chamber 20 as seen in conveying direction is connected to the second intermediate chamber 20 as seen in conveying direction via a connecting line 46, there is increased pressure also in said second intermediate chamber 20. The relevant compressed air also enters the conveying chamber of the rotary feeder 18 that is in position 30. There is therefore an increased pressure in the chamber in position 32. The pressure in the chamber in position 34, which is initially also increased, is carried off via a pressure relief device. In the embodiment presented, the pressure relief device comprises at least one channel or one line 40 which is connected to an area of the mechanical conveying device 18 in which the emptied conveying chamber, for example, in the area of position 34, is connected neither to the intermediate chamber 20 nor to the storage container 10. A valve 41, in particular, a non-return valve, may be optionally specified in the line 40 in particular in the area in which the line 40 is connected to the rotary feeder 18. The area of position 34 seen in FIG. 2 may be referred to as an isolated area.

Since residual amounts of binding agent may still be present in the chamber in position 34, these may enter the pressure relief device 40, 41. The pressure relief device 40, 41 is therefore connected to the storage container 10 so that any binding agent present in the line 40 is conveyed back into the storage container 10. In order to avoid the formation of positive pressure in the storage container 10, the storage container 10 comprises a positive pressure outlet 44 connected to a filter 42. In order to avoid a swirling of binding agents in the storage container 10, the line 40 is connected to the same in an upper area of the storage container 10.

For conveying the binding agent to the spreading device or to a buffer container 52 (FIG. 3) of the spreading device, respectively, pressurized air is fed, by means of the compressor 36, to the first intermediate chamber 20 as seen in conveying direction via the pressure line 38. The first intermediate chamber 20 is connected to the second intermediate chamber 20 as seen in the direction of flow via the connecting line 46 so that binding agent is conveyed from the first intermediate chamber 20 into the second intermediate chamber 20 through the connecting line 46. The second intermediate chamber 20 as seen in the direction of flow is connected to the spreading device or the buffer container 52 of the spreading device, respectively, via a conveying line 48.

Furthermore, a bypass line 50 bridging the two intermediate chambers 20 is connected to the pressure line 38 upstream of the first intermediate chamber 20 as seen in the direction of flow, and is connected to the conveying line 48 downstream of the second intermediate chamber 20 as seen in the direction of flow. The bypass line 50 is connected to the connecting line 46 via a branching line 51. For control of the distribution of the compressed air, an in particular controllable valve may be arranged, for example, in the bypass line 50 and/or in the branching line.

Depending on the design, the pneumatic conveying device therefore comprises a compressed air source which, in the embodiment presented, is a compressor 36, and lines. In addition to the compressed air line 38, the pneumatic conveying device may comprise the lines 46, 50, 51 and 48. The pneumatic conveying device may also be referred to as a pneumatic conveyor.

For conveying the binding agent, pressure is applied to the pneumatic conveying device from a pressure source which, in the embodiment, is the compressor 36. This leads to increased pressure in the conveying device compared to the environment. For transferring the binding agent from the conveying chambers into the intermediate container 20, the conveying chambers are connected, in an air-permeable fashion, to the intermediate container 20 and thus to the pneumatic conveying device exhibiting a positive pressure compared to the environment. In the embodiment presented, there is therefore an increased air pressure compared to the environment also in the conveying chambers in positions 30 and 32. In the conveying chamber in position 30, there is an increased air pressure due to the currently present air-permeable connection to the pneumatic conveying device. In the conveying chamber in position 32, the pressure was increased when the same was connected to the intermediate chamber 20 in an air-permeable fashion for the discharge of binding agent. With the continued rotation of the rotary airlock 18, said air-permeable connection was interrupted; the pressure present can, however, not be reduced. According to the present invention, the pressure relief device 40, 41 is specified in position 34 of the mechanical conveying device 18.

Figure 2:
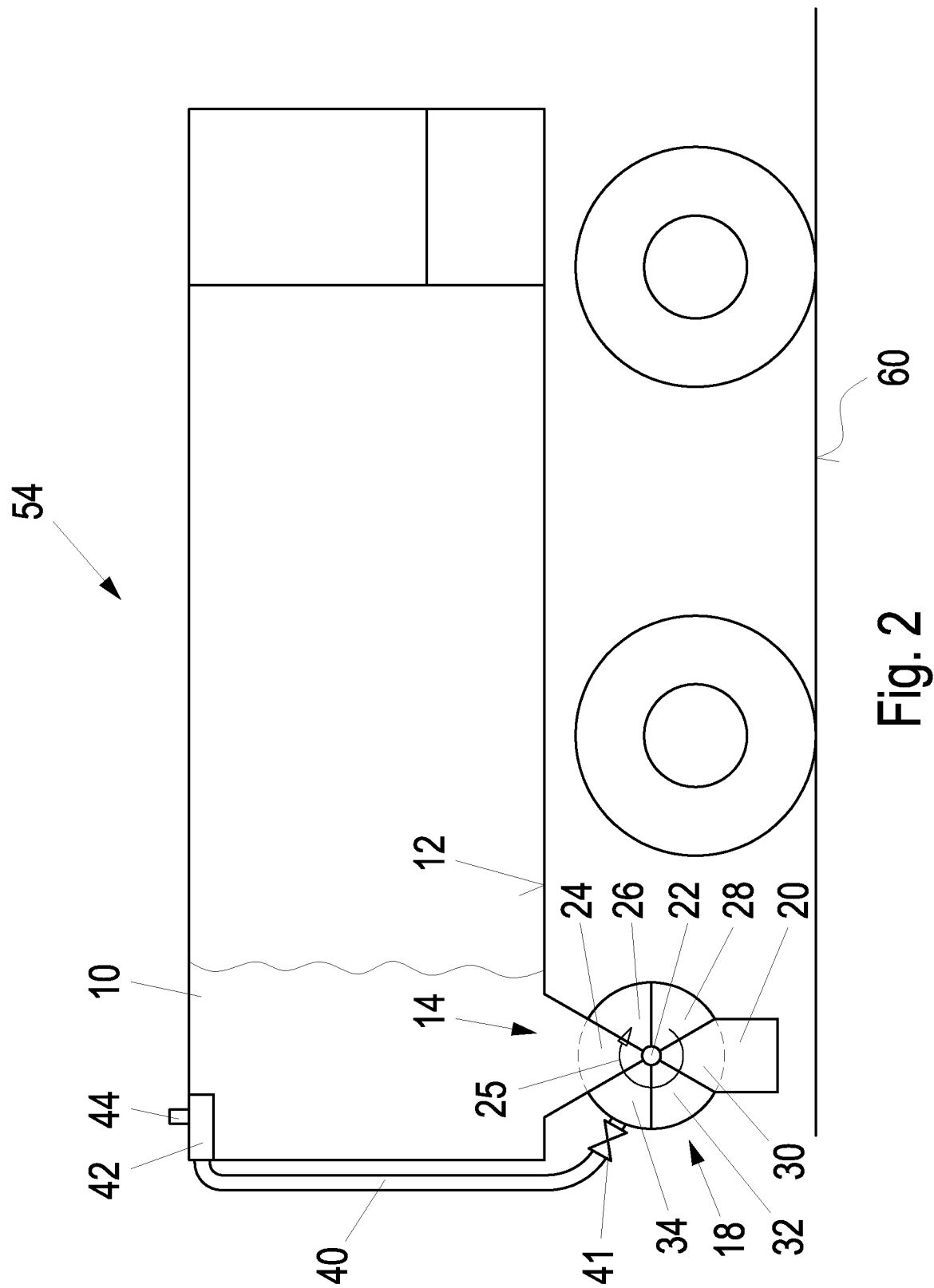
FIG. 2: a schematic sectional view along line II-II in FIG. 1.
Figure 3:
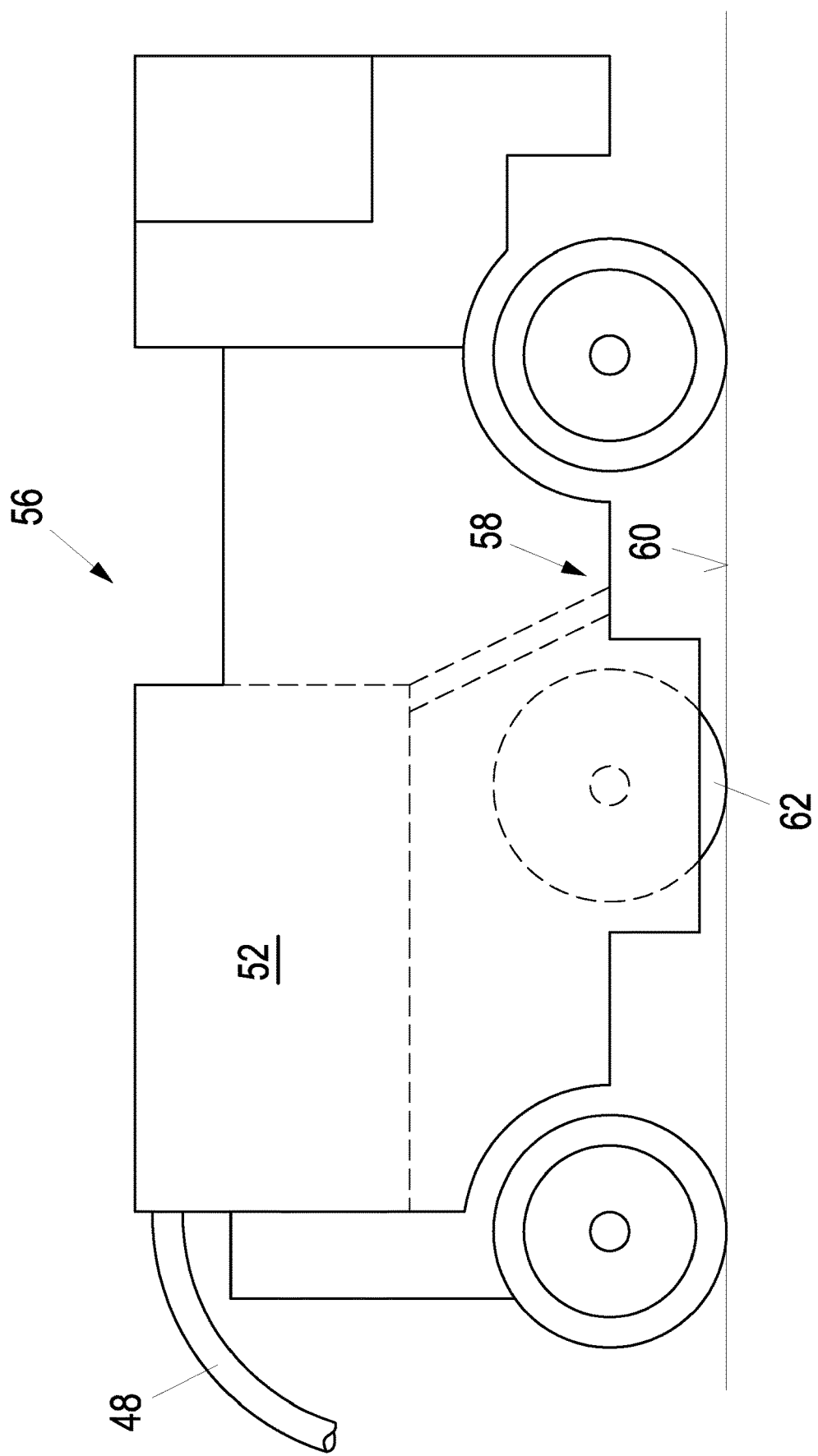
FIG. 3 a schematic side view of a ground working machine.

The dry-bulk tanker 54 presented in FIG. 2 is connected to the ground working machine 56 presented in FIG. 3 via the conveying line 48. The ground working machine 56 comprises the buffer container 52 which is connected to the conveying line 48 and is used for the intermediate buffering of binding agent. A spreading device 58 not presented in further detail is connected to the buffer container 52. Binding agent is spread on a surface 60 of a ground to be milled-off, such as a road surface, via the spreading device 58. The surface 60 is thereupon removed by means of a milling and mixing rotor 62. Such ground working machine with buffer container 52 is described, for example, in DE 10 2009 008 884.

The invention claimed is:

1. A dry-bulk tanker for the provision of binding agent for soil stabilization to a spreading device, the dry-bulk tanker comprising:
    a storage container for the binding agent;
    at least one intermediate chamber;
    at least one mechanical conveyor configured to convey the binding agent from the storage container to the at least one intermediate container, the at least one mechanical conveyor including a rotary feeder including a plurality of conveying chambers, and the at least one mechanical conveyor including an isolated area wherein any one of the conveying chambers passing through the isolated area is connected neither to the storage container nor to the at least one intermediate chamber;
    a pneumatic conveyor configured to convey the binding agent from the at least one intermediate chamber to the spreading device; and
    a pressure relief device connected to the isolated area of the at least one mechanical conveyor.

2. The dry-bulk tanker of claim 1, wherein:
    the at least one mechanical conveyor comprises a gravity conveyor.

3. The dry-bulk tanker of claim 1, wherein:
    the pressure relief device includes a vent line connected to the storage container.

4. The dry-bulk tanker of claim 1, further comprising:
    a positive pressure outlet communicated with the storage container; and a filter configured to prevent binding agent from passing through the positive pressure outlet.

5. The dry-bulk tanker of claim 4, wherein:
the pressure relief device includes a line communicated with the positive pressure outlet.

6. The dry-bulk tanker of claim 1, wherein:
the pneumatic conveyor includes a compressor and a pressure line connecting the compressor to the at least one intermediate chamber.

7. The dry-bulk tanker of claim 1, wherein:
the at least one mechanical conveyor includes at least two mechanical conveyors configured to convey the binding agent from the storage container to the at least one intermediate chamber.

8. The dry-bulk tanker of claim 7, wherein:
the at least one intermediate chamber includes at least two intermediate chambers; and
each of the at least two mechanical conveyors is connected to a separate one of the at least two intermediate chambers.

9. The dry-bulk tanker of claim 8, wherein:
the at least two intermediate chambers are arranged in series with respect to the pneumatic conveyor.

10. The dry-bulk tanker of claim 1, wherein:
the pneumatic conveyor includes a conveying line configured to feed the binding agent from the at least one intermediate chamber to the spreading device, and the pneumatic conveyor includes a pneumatic bypass line bypassing the at least one intermediate chamber and connected to the conveying line.

11. A conveying system for a dry-bulk tanker for the provision of binding agent for soil stabilization to a spreading device, the conveying system comprising:
at least one mechanical conveyor configured to convey binding agent;
at least one intermediate chamber configured to receive the binding agent conveyed by the at least one mechanical conveyor;
wherein the at least one mechanical conveyor includes a rotary feeder including a plurality of conveying chambers; and
wherein the at least one mechanical conveyor includes an isolated area, and any one of the conveying chambers passing through the isolated area is connected neither to the storage container nor to the at least one intermediate chamber;
a pneumatic conveyor configured to convey the binding agent from the at least one intermediate chamber to the spreading device; and
a pressure relief line communicated with the isolated area of the at least one mechanical conveyor.

12. The conveying system of claim 11, wherein:
the pneumatic conveyor includes a compressor and a pressure line connecting the compressor to the at least one intermediate chamber.

13. The conveying system of claim 11, wherein:
the pressure relief line connects the isolated area to the storage container.

14. The conveying system of claim 11, wherein:
the at least one mechanical conveyor includes at least two mechanical conveyors configured to convey the binding agent from the storage container to the at least one intermediate chamber;
the at least one intermediate chamber includes at least two intermediate chambers;
each of the at least two mechanical conveyors is connected to a separate one of the at least two intermediate chambers; and
the at least two intermediate chambers are arranged in series with respect to the pneumatic conveyor.

15. A work train for working soils, the work train comprising:
a self-propelled ground working machine including a milling or mixing rotor arranged in a rotor housing, and including a spreading device for spreading binding agent; and
a dry-bulk tanker including:
a storage container for the binding agent;
at least one intermediate chamber;
at least one mechanical conveyor configured to convey the binding agent from the storage container to the at least one intermediate container;
a pneumatic conveyor configured to convey the binding agent from the at least one intermediate chamber to the spreading device; and
a pressure relief device including a vent line communicated with the at least one mechanical conveyor;
wherein the at least one mechanical conveyor includes a rotary feeder including a plurality of conveying chambers; and
wherein the at least one mechanical conveyor includes an isolated area, and any one of the conveying chambers passing through the isolated area is connected neither to the storage container nor to the at least one intermediate chamber, and the vent line is communicated with the isolated area of the at least one mechanical conveyor.

16. The work train of claim 15, wherein:
the spreading device includes a buffer container for the binding agent; and
further comprising a conveying line connecting the pneumatic conveyor to the buffer container.

* * * * *

UNITED STATES PATENT AND TRADEMARK OFFICE
CERTIFICATE OF CORRECTION

PATENT NO. : 10,619,322 B2  
APPLICATION NO. : 16/223164  
DATED : April 14, 2020  
INVENTOR(S) : Christoph Menzenbach, Cyrus Barimani and Frederic Hess Page 1 of 1

It is certified that error appears in the above-identified patent and that said Letters Patent is hereby corrected as shown below:

In the Specification

In Column 1, Line 53, replace "regu-larly" with --regularly--;
In Column 3, Line 38, replace "con-tinues" with --continues--;
In Column 4, Line 9, replace "occur-rence" with --occurrence--;
In Column 4, Line 61, replace "discon-nectable" with --disconnectable--;
In Column 4, Line 66, replace "sepa-rately" with --separately--;
In Column 6, Line 8, replace "re-quirements" with --requirements--.

Signed and Sealed this
Twenty-third Day of June, 2020

Andrei Iancu
*Director of the United States Patent and Trademark Office*